(12) United States Patent
Trivedi et al.

(10) Patent No.: US 8,253,405 B2
(45) Date of Patent: Aug. 28, 2012

(54) HIGH SPEED VOLTAGE REGULATOR WITH INTEGRATED LOSELESS CURRENT SENSING

(76) Inventors: Malay Trivedi, Chandler, AZ (US);
Jiang William, Cupertino, CA (US);
Brent D. Thomas, Chandler, AZ (US);
James T. Doyle, Phoenix, AZ (US);
Rose Wang, Chandler, AZ (US)

( * ) Notice: Subject to any disclaimer, the term of this patent is extended or adjusted under 35 U.S.C. 154(b) by 803 days.

(21) Appl. No.: 12/347,711

(22) Filed: Dec. 31, 2008

(65) Prior Publication Data
US 2010/0164477 A1    Jul. 1, 2010

(51) Int. Cl.
*G05F 1/00* (2006.01)
(52) U.S. Cl. ...................................... 323/283
(58) Field of Classification Search ........... 323/282–285
See application file for complete search history.

(56) References Cited

U.S. PATENT DOCUMENTS

| | | | |
|---|---|---|---|
| 2006/0001408 A1* | 1/2006 | Southwell et al. | 323/282 |
| 2007/0013350 A1* | 1/2007 | Tang et al. | 323/237 |
| 2008/0278123 A1* | 11/2008 | Mehas et al. | 323/266 |

* cited by examiner

*Primary Examiner* — Jue Zhang
(74) *Attorney, Agent, or Firm* — Ryder, Lu, Mazzeo and Konieczny, LLC

(57) ABSTRACT

In general, in one aspect, the disclosure describes a high-speed multi-phase voltage regulator (VR) capable of sensing load current. For each phase leg, the VR includes a current mirror to mirror current in switching elements, a current sense to sense high side current in the current mirror, and a I-V converter to convert the sensed high side current to a voltage. The high side sensed current for each phase leg is averaged and the duty cycle for the VR is extracted. The average high side sensed current and the duty cycle are converted to digital by an A-D converter. Digital circuitry corrects the sensed current by adjusting for the gain and offset voltage of the VR. The adjusted sensed value is divided by the duty cycle to convert to load current and the average load current is multiplied by the number of phases operating to determine overall load current.

20 Claims, 4 Drawing Sheets

HIGH SPEED VOLTAGE REGULATOR WITH INTEGRATED LOSELESS CURRENT SENSING

BACKGROUND

Mobile computer platforms may support multiple output voltages and may operate at high speeds. Accurate current sense information for the load (CPU) is required to manage the performance of the platform against thermal and battery lifetime constraints. Accurate current sense information is required for switching power conversion. Advances in power management technology and voltage/current ratings are now making accurate current sensing a requirement.

On-board discrete components may be utilized for current sensing of the load but the discrete components consume area and power. In addition, an external controller has to process the sensed information. Integrated sense transistors within the switching portion of a voltage regulator (VR) may be utilized to sense load current but limit the switching speed of the VR.

BRIEF DESCRIPTION OF THE DRAWINGS

The features and advantages of the various embodiments will become apparent from the following detailed description in which.

DETAILED DESCRIPTION

Figure 1:
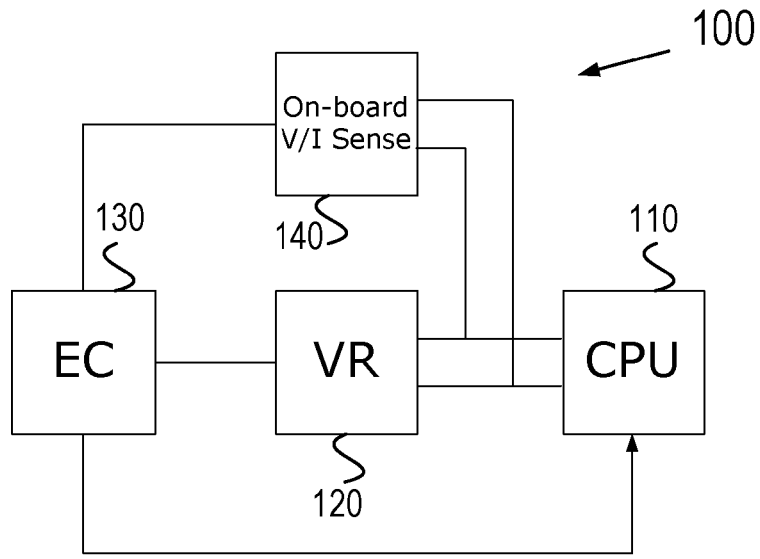
FIG. 1 illustrates a high level block diagram of a computing platform.

FIG. 1 illustrates a high level block diagram of a computing platform 100. The platform 100 includes a load (CPU) 110, a voltage regulator (VR) 120, external power management control (EC) 130, and on-board voltage/current (V/I) sense elements 140. The CPU 110 provides the processing for the system 100. The VR 120 provides regulated voltages to the CPU 110 for various load conditions. The EC 130 monitors and manages the power consumption of the platform and performs platform diagnostics. The EC 130 requires accurate voltage and current information of all loads on the platform 100 to optimally manage the performance of the platform against thermal and battery lifetime constraints. The on board V/I sense elements 140 are utilized to sense the current and voltage for different loads and provide the sensed data to the EC 130. The EC 130 may have to process the sensed information provided by the on board V/I sense elements 140. The implementation of the on board V/I sense elements 140 and the processing of the sensed information by the EC 130 may be performed by the platform designers. Furthermore, the on board V/I sense elements 140 consume area/power, and suffer from sense errors due to part tolerance, drift and losses. Directly providing accurate rail current information from the VR 120 may substantially reduce the platform designers overhead by eliminating the need to do any platform (on board) current sensing or post-processing of the current sensing by the EC 130.

The VR 120 may use at least one or more switch and/or rectifier elements and an inductor to implement a "phase leg" to deliver switchably controlled current from an applied voltage source to the load 110 through a regulated voltage node. When the load 110 requires more current, the one or more switches are controlled to supply the load with current from the applied voltage for longer durations within a switching period (higher duty cycle). Conversely, the current is applied for smaller durations in the period (lower duty cycle) when less current is required by the load. A multi-phase VR 120 may have several phase legs commonly coupled to the regulated voltage node to deliver to it their current. The conduction time of the individual phase legs are staggered, typically uniformly, over a switching interval to minimize output voltage/current ripple, and to reduce the size of output capacitance needed to filter switching noise.

Integrated sense transistors (senseFET) have been implemented in VRs 120 as a lossless sensing means that offers high sense accuracy if it is possible to integrate the sense element with the switching transistors (switch element) portion of the VR 120. The senseFET mirrors the high-side (control) transistor current and provides an instantaneous representation of the inductor current during the charging cycle of the VR. However, the high-side FET current sensing, by itself, does not provide the load current, and requires post-processing to extract the load current. Moreover, the senseFET is typically used in VRs having a switching speed on the order of 1 MHZ. Motherboard area constraints and expectations of fast transient response as well as state transitions are forcing miniaturization of the VR 120 for close proximity to the load 110 and switching operations at very-high frequency (e.g., 30-50 MHz).

Figure 2:
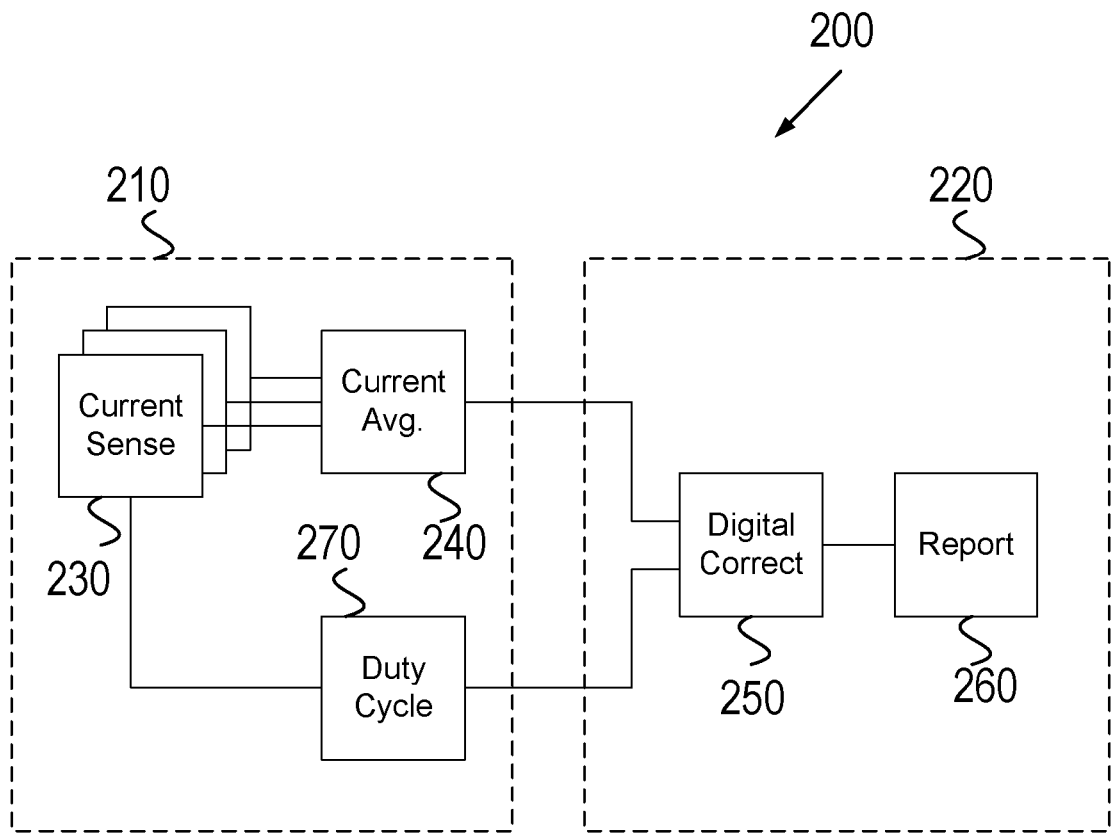
FIG. 2 illustrates a high-level functional block diagram of an example high-speed current sensing multi-phase voltage regulator (VR), according to one embodiment.

FIG. 2 illustrates a high-level functional block diagram of an example high-speed current sensing multi-phase VR 200. The VR 200 performs functions in both an analog domain 210 and a digital domain 220. Within the analog domain 210, the VR 200 performs high-speed current sensing 230 for each phase of the VR 200 and averages the sensed currents from each phase 240. Within the digital domain 210, the VR 200 performs post-processing error correction 250 and reporting 260. The average sensed current ($V_{iavg}$) may be a function of load current ($I_{load}$) and duty cycle (D) such that $V_{iavg} = (D*I_{load})$. Accordingly, in order to accurately calculate $I_{load}$ from $V_{iavg}$, D needs to be measured. D can be measured 270 in the analog domain 210 and utilized in the error correction 250.

Figure 3:
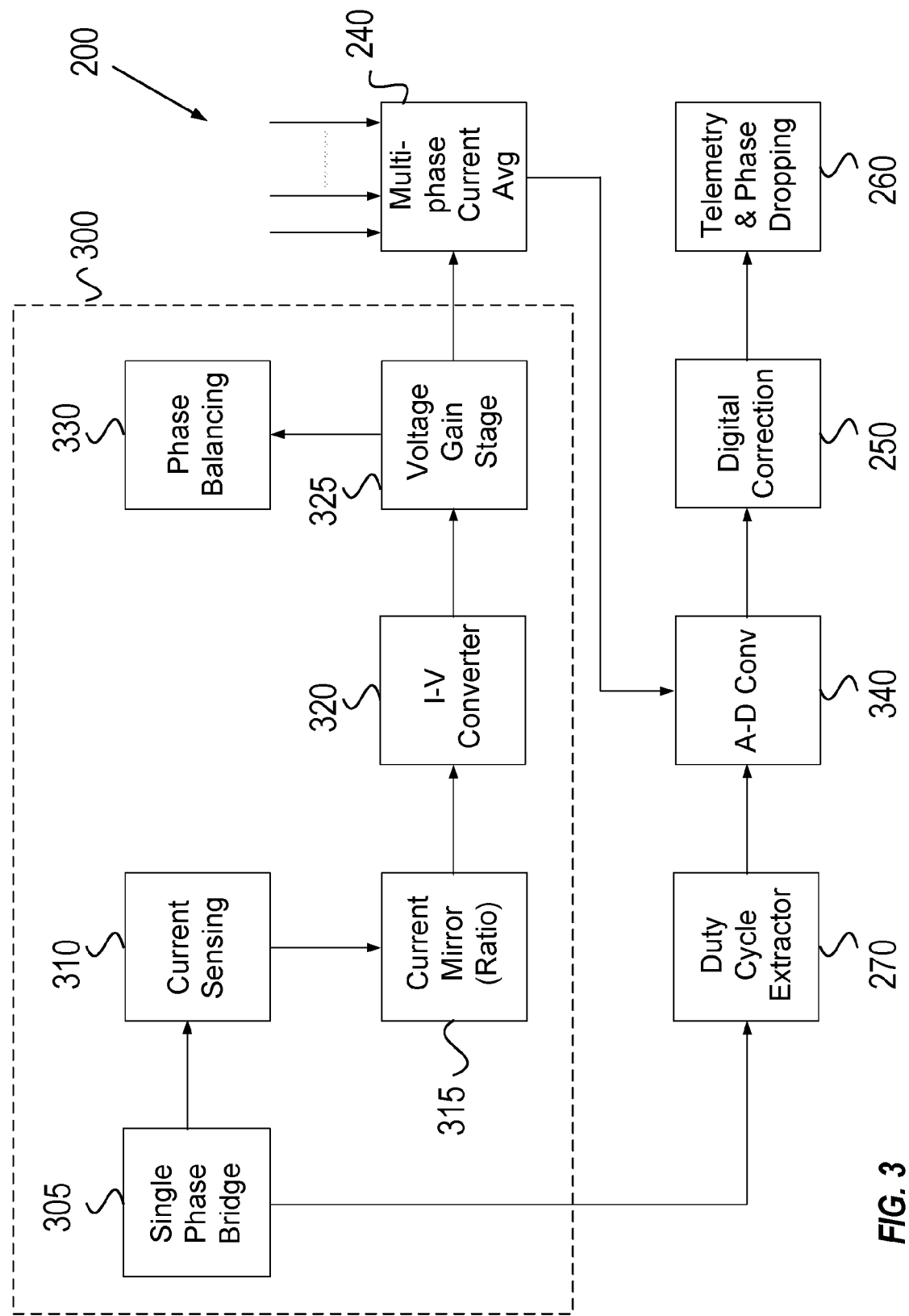
FIG. 3 illustrates a more detailed functional block diagram of the example high-speed current sensing multi-phase VR of FIG. 2, according to one embodiment.

FIG. 3 illustrates a more detailed functional block diagram of the example high-speed current sensing multi-phase VR 200. Each phase 300 of the VR 200 includes a single phase bridge (e.g., switching transistors) 305, current sensing 310, current mirror 315, current to voltage (I-V) converter 320, voltage gain stage 325, and phase balancing 330. The current mirror 315 may mirror the current of the single phase bridge 305 and the current sensing 310 may sense the high side transistor current in the current mirror 315. Since the current is being sensed from the current mirror 315 the duty cycle of the VR 200 may affect how the sensed current equates to the $I_{load}$. The sensed current may be a fraction of the current supported by the high-side control transistor of the bridge 305 (e.g., based on the duty cycle of the VR 200). The current sense 310 and current mirror 315 may be used to sense current in VRs having high switching speeds (e.g., 30-50 MHz).

The sensed current may be provided to the I-V converter 320 where the sensed current is converted to a voltage and may band limit the voltage to reject spurious noise. The voltage gain stage 325 gains up the voltage to maximize the useable voltage range (e.g., maximize available analog-to-digital range). The output of the voltage gain stage 325 is the average sensed high-side transistor current per phase. The phase balancing 330 may utilize the per phase sensed current for phase current balance of the VR 200. The per phase sensed current may also be used for current-mode control in a regulation feedback loop (not illustrated). The multi-phase current averaging 240 receives the sensed high-side transistor current (in the from of a voltage) for all phases and combines them together to generate an average high-side transistor current over all phases ($V_{iavg}$).

The duty cycle extractor 270 measures the duty cycle of the VR 200. The duty cycle may be sensed with minimal sense error. An analog to digital converter (ADC) 245 receives the D from the duty cycle extractor 270 and the $V_{iavg}$ from the multi-phase current averaging 240 and translates them to the digital domain 220. Once in the digital domain 220 the digital correction 250 corrects for gain and offset errors. The telemetry and phase dropping 260 may perform platform diagnostics.

Figure 4:
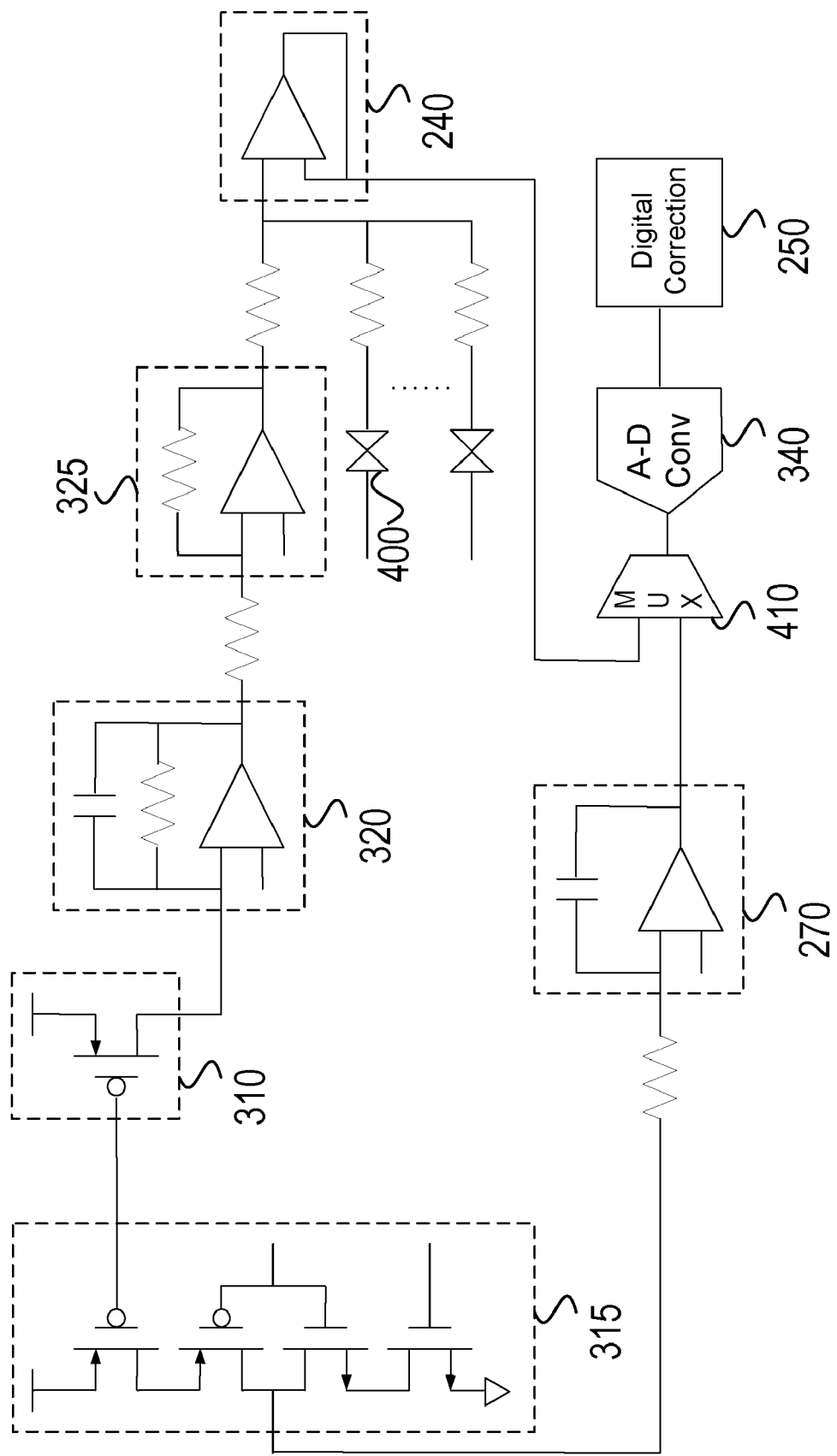
FIG. 4 illustrates a schematic diagram of the example VR of FIG. 2, according to one embodiment.

FIG. 4 illustrates a schematic diagram of the example VR 200. The high-speed inductor current waveform is reconstructed by using mirror high-side current sense elements, with a nominal main-path to sense-path ratio. The current mirror 315 may include a stack of transistors (e.g., two positive channel transistors (PMOS) stacked on top of two negative channel transistors (NMOS)). The current sensing 315 may include a transistor (e.g., PMOS) coupled to the high side transistor of the current mirror 310.

The number of active phases at any time is determined dynamically as a function of the sensed average current. The output sensed current from inactive or disabled phases floats and could corrupt the average signal. For this reason, a transmission gate (T-gate) 400 is connected at the input to the averaging amplifier 240. The T-gate 400 disconnects the input from the disabled phase. The T-gate is connected to all phase inputs other than the reference phase, since the reference phase is always on once the rail is enabled. As a result, the output ($V_{iavg}$) of the averaging amplifier 240 is the average high-side transistor current of only the conducting phases of any given rail.

The VR 200 may include a multiplexer 410 that receives the $V_{iavg}$ from the averaging amplifier 240 and the D from the duty cycle extractor 270 and provides the appropriate signal to the ADC 340 based on the operation of the digital correction 250.

The average sensed current ($V_{iavg}$) measured may include errors. The errors may be based on the offset voltage ($V_{os}$) and gain (G) of the VR 200. Accordingly, the $V_{iavg}$ may be a function of measurement errors ($V_{os}$, G), and number of active phases (N) in the VR 200 in addition to load current ($I_{load}$) and duty cycle (D), such that $V_{iavg} = \{(D*N*I_{load})/G\} + V_{os}$. In order to use $V_{iavg}$ to estimate $I_{load}$ appropriate corrections need to be made such that $I_{load} = \{(V_{iavg} - V_{os})*G\}/(D*N)$. The corrections (modifications to $V_{iavg}$) are performed digitally by the digital correction 250.

The G and the $V_{os}$ can be determined at test and stored as trim values. The G and the $V_{os}$ may be extracted by testing two of the rails at a common load current, but different duty ratios, or by testing a single rail at two current levels. This approach is totally independent of tolerance and losses of other elements on the board or the chip. Temperature drift of current sense characteristics is small and does not need correction.

Figure 5:
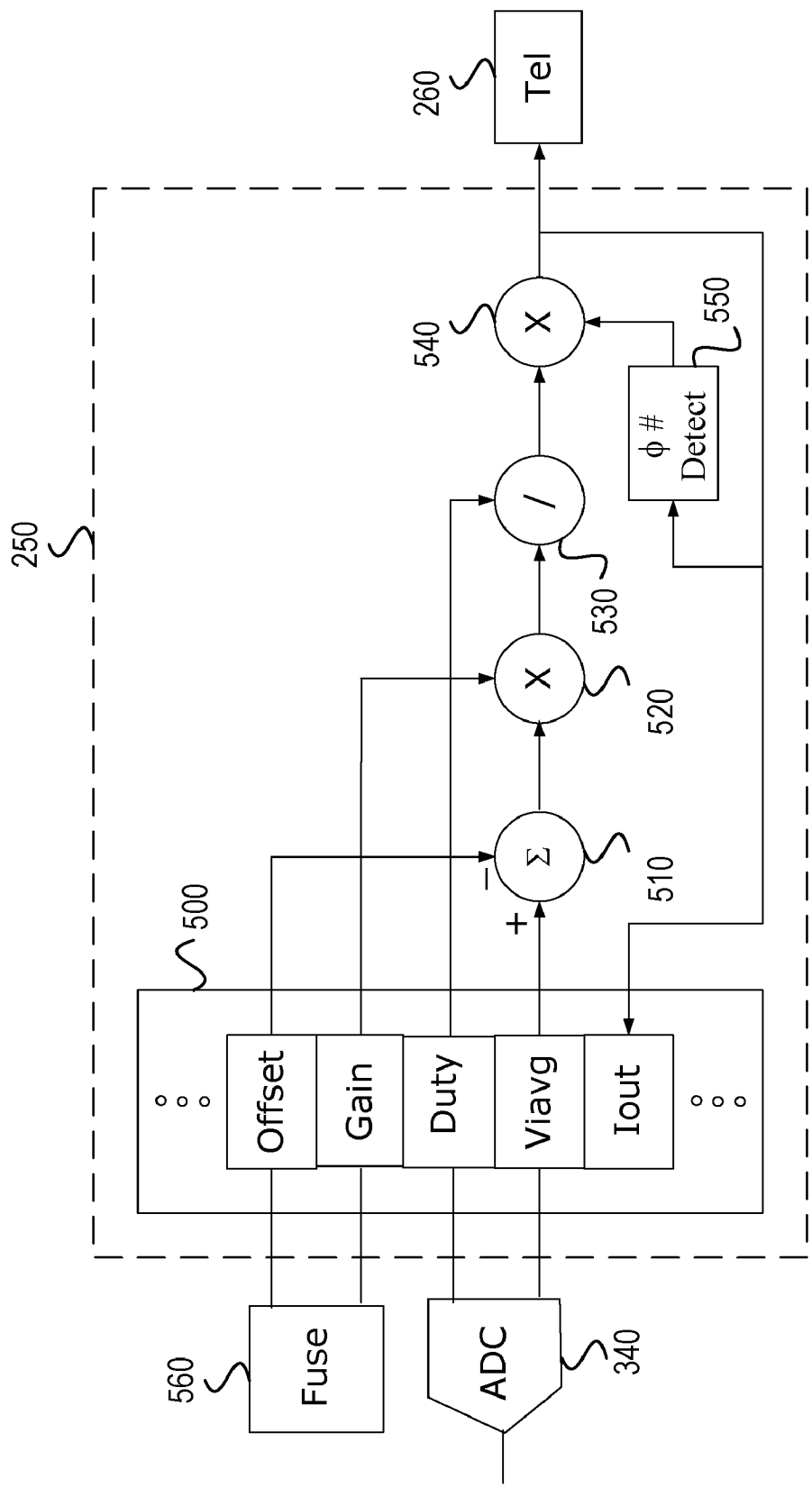
FIG. 5 illustrates an example digital correction function used in the example VR of FIG. 2, according to one embodiment.

FIG. 5 illustrates an example digital correction function 250. The digital correction function 250 includes a register 500, a summer 510, a multiplier 520, a divider 530, a multiplier 540 and a phase number detector 550. The digital correction function 250 receives the parameters ($V_{iavg}$, $V_{os}$, G and D) used to calculate the load current ($I_{load}$) and stores them in the register 500. The register 500 may receive the $V_{iavg}$ and D from the ADC 340. As noted above, the $V_{os}$ and G values can be trimmed at test and stored in a fuse bank 560 and the register 500 may receive them from the fuze bank 560. The order of sensing from the register 500 is utilized to convert $V_{iavg}$ to $I_{load}$. The $V_{iavg}$ is first offset corrected (the summer 510 subtracts the $V_{os}$ from $V_{iavg}$) and then gain corrected (the multiplier 520 multiplies the output of the summer 510 by G) to extract the true $V_{iavg}$. Subsequent division by the duty cycle (the divider 530 divides the output of the multiplier 520 by D) provides the average load current per phase. Multiplying the average load current per phase by N with the multiplier 540 provides the actual load current. The N is determined by the digital control logic 550 based on the sensed load current.

The digital correction function 250 yields the corrected current sense that equates to $I_{load}$ and is available for telemetry 260, over-current protection, phase-count detection and other functions.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:
1. An apparatus comprising
an analog domain to perform current sensing for each phase of a voltage regulator (VR), average the sensed currents from each phase to generate an average sensed current of the VR, and measure duty cycle of the VR; and
a digital domain to receive the average sensed current of the VR and the duty cycle of the VR and to use these values to calculate load current.

2. The apparatus of claim 1, wherein the analog domain includes
a current mirror for each phase of the VR, wherein each current mirror is to mirror current in bridge of each respective phase of the VR;
a current sense for each phase of the VR, wherein each current sense is to sense high side current in the respective current mirror; and
an averager to receive the high side sensed current for each phase and to generate the average sensed current of the VR.

3. The apparatus of claim 2, wherein the analog domain further includes a current to voltage (IV) converter for each phase of the VR, wherein each IV converter is to convert the associated sensed high side current to a voltage representing the sensed high side current, wherein the averager is to receive the voltage representing the high side sensed current for each phase and to generate a voltage representing the average sensed current for the VR.

4. The apparatus of claim 3, wherein the analog domain further includes a voltage gain stage for each phase of the VR.

5. The apparatus of claim 1, wherein the digital domain is to adjust the average sensed current to adjust for errors in measurement thereof.

6. The apparatus of claim 5, wherein the errors adjusted for include offset voltage and gain of the VR.

7. The apparatus of claim 6, wherein the digital domain is to receive correction values for the offset voltage and the gain from the VR, wherein the correction values are determined during test of the VR.

8. A voltage regulator (VR) comprising
a plurality of phase legs commonly coupled to a regulated voltage node, wherein each phase leg is to deliver switchably controlled current from an applied voltage source to a load through the regulated voltage node, wherein each of the plurality of phase legs includes
a current mirror to mirror current in switching elements; and
a current sense to sense high side current in the current mirror;
an averager to receive the high side sensed current for each phase leg and to generate an average sensed current for the plurality of phase legs;
a digital correction circuitry to correct errors in the average sensed current and convert the corrected sensed current to load current; and
a duty cycle extractor to extract duty cycle of the VR, wherein the digital correction circuitry is to use the duty cycle to convert the corrected sensed current to an average load current.

9. The VR of claim 8, wherein the digital correction circuitry is to modify the average sensed current to account for offset voltage and gain of the VR.

10. The VR of claim 8, wherein the digital correction circuitry is to determine number of phases operating and multiply the average load current by the number of phases to determine the load current.

11. The VR of claim 8, further comprising platform diagnostics to analyze load power consumption.

12. The VR of claim 8, further comprising phase balancing circuitry to balance the VR based on the sensed current for each phase.

13. The VR of claim 8, wherein the current mirrors include a plurality of transistors in series.

14. The VR of claim 8, wherein each of the plurality of phase legs further includes a current to voltage (IV) converter to convert the sensed high side current to a voltage representing the sensed high side current.

15. The VR of claim 8, further comprising an analog-to-digital converter to convert the duty cycle and the average sensed current to digital.

16. An apparatus comprising
an analog domain to perform current sensing for each phase of a voltage regulator (VR), average the sensed currents from each phase to generate an average sensed current of the VR, and measure duty cycle of the VR, wherein the analog domain includes
a current mirror for each phase of the VR, wherein each current mirror is to mirror current in bridge of each respective phase of the VR,
a current sense for each phase of the VR, wherein each current sense is to sense high side current in the respective current mirror, and
an averager to receive the high side sensed current for each phase and to generate the average sensed current of the VR; and
a digital domain to perform post-processing on the average sensed current to calculate load current.

17. The apparatus of claim 16, wherein the analog domain further includes a current to voltage (IV) converter for each phase of the VR, wherein each IV converter is to convert the associated sensed high side current to a voltage representing the sensed high side current, wherein the averager is to receive the voltage representing the high side sensed current for each phase and to generate a voltage representing the average sensed current for the VR.

18. The apparatus of claim 17, wherein the analog domain further includes a voltage gain stage for each phase of the VR.

19. The apparatus of claim 16, wherein the digital domain is to adjust the average sensed current to adjust for errors in measurement thereof, wherein the errors adjusted for include offset voltage and gain of the VR.

20. The apparatus of claim 19, wherein the digital domain is to receive correction values for the offset voltage and the gain from the VR, wherein the correction values are determined during test of the VR.

* * * * *